Patented Aug. 4, 1936

2,049,449

UNITED STATES PATENT OFFICE 2,049,449

FABRICATED STRUCTURE AND METHOD OF MAKING THE SAME

Herbert C. Jennison, Bridgeport, Conn., assignor to The American Brass Company, Waterbury, Conn., a corporation of Connecticut No Drawing. Application October 21, 1931, Serial No. 570,156

6 Claims. (Cl. 113—112)

This invention relates to a wrought or worked alloy and articles made therefrom, which are particularly adapted for autogenous welding, and which may be used for making various wrought or worked shapes either regular or irregular, such as extruded, rolled, drawn, forged or pressed shapes as tubes either rectangular, irregular or round, large hollow cylinders, sheets for tanks either open or closed, shapes for architectural work as moldings, window frames and similar shapes, and other regular and irregular shapes where it is desirable to use them in fabricating structures or connecting with each other by autogenous welding.

Copper elements or shapes are commonly used in fabricating various structures, and it is common to make the joints by soldering with silver or similar solder which is expensive, or by riveting, as it has been impossible to make satisfactory welds where the articles are made of copper. Welded joints are desirable as the soldered and riveted joints are not nearly as sightly or as strong as would be a satisfactory welded joint, and also they are more apt to deteriorate in use.

It is therefore an object of this invention to provide an alloy to take the place of the usual copper shapes, which when wrought and worked into the various shapes can be readily autogenously welded at the joints so as to do away with the necessity of soldering or riveting, and much better joints can be produced.

I have found that by the addition of from about 0.35 percent to about 10 percent silicon to copper an alloy is produced which can be readily wrought or worked into various shapes which can be readily joined by autogenous welding. It is particularly adapted for such shapes as tubes rectangular, round or irregular, hollow cylinders, rolled sheets for making tanks either open or closed, and to be extruded, rolled, drawn or pressed into other shapes, such as are adapted for building, architectural and similar uses where it is desirable to make the joints by autogenous welding. I have found that by the addition of this silicon to the copper the welding properties of the worked or wrought metal are greatly increased, that autogenous welds can be made, that the welds are dense and homogeneous, and when the weld is ground off and polished it is practically indistinguishable from the base metal. Also that the strength of the weld is practically the same as that of the base metal. By autogenous welding I mean welding in which the metal of the weld is of substantially the same constituency or composition as the base metal of the members welded together whether or not additional metal is added from a welding or filler rod, and whether the welding is done with a gas or blow torch, by electric arc, or other source of heat.

The preferred alloy comprises approximately 3.5 percent silicon and the balance copper, and I have found that wrought or worked members or elements made from this alloy can be readily welded autogenously, and that the welds are strong, dense and uniform. I have also found that the alloy can be readily worked or wrought, such as hot rolled or extruded into irregular and regular shapes, and can also be cold rolled or drawn into various shapes. The material can be used for a large number of purposes, such as tubes of various shapes rectangular, irregular and round, and also large hollow cylinders, tanks either open or closed, and can be worked into the shapes and members for use where copper is now commonly used, such as architectural purposes for making door fronts, building fronts, window frames, moldings and similar work. It has been found that this worked or wrought alloy is particularly adapted for these and other purposes where it is desired that the joints be made by autogenous welding instead of soldering, brazing or riveting.

It has been found that when this copper-silicon alloy has been worked, the welding properties are greatly increased over that of copper. The weld has a tensile strength almost equal to that of the base metal. The weld is also very sound and homogeneous, and the metal welds readily so that the joints can be easily and readily made. After the weld has been made, ground and polished it is practically impossible to detect it. This wrought metal can be used where worked copper is now generally employed and the joints made by soldering or riveting due to the difficulty of making satisfactory welded joints, and this copper-silicon wrought alloy is a great improvement over the copper for these purposes because the joints can be readily made by autogenous welding. The weld is strong and homogeneous and after the weld has been made, ground, and polished it is practically impossible to detect it, so that the joined members are practically the same as if made in one piece.

Although a worked or wrought copper-silicon alloy having approximately the above noted proportions of silicon has proven very satisfactory as having improved properties for autogenous welding, I am not limited thereto as the proportion of the silicon may be varied considerably without losing this adaptability for autogenous welding. The amount of silicon is preferably below 6 per cent and above 2 percent, a silicon content of approximately 3.5 percent having been found very satisfactory.

The welding properties of this alloy are not materially changed by additions of small amounts of other elements, and therefore the additions of small amounts of these elements would not materially change the adaptability of this alloy for the purposes intended. For example when either manganese, tin or iron in various amounts up to about 3 percent is added to the alloy, or when zinc in various amounts up to about 10 percent is added to the alloy, either individually or in combination with each other in amounts up to about these limits, the autogenous welding properties of the worked metal are not materially changed, although other properties may be affected or modified. The manganese, tin and zinc each have the tendency to improve the welding properties somewhat. The manganese, tin, iron and zinc each add to the strength of the material and tend to harden it, depending on the amount used. In addition the manganese improves the hot workability. The tin in addition to hardening and giving increased strength would improve its bearing qualities, and the zinc would also increase the hot working properties.

Also there are a large number of other elements which when added in similar amounts do not materially change the welding properties of the worked alloy but may be added for other purposes.

In short this alloy when worked or wrought makes a strong, dense, homogeneous and very satisfactory autogenous weld. It also welds easily and therefore members formed of this wrought metal can be very readily and satisfactorily joined by autogenous welding either in the shop or on the job.

Having thus set forth the nature of my invention, what I claim is:

1. A method of making a fabricated structure comprising working an alloy composed of from 0.35% to 10% silicon, manganese in appreciable amount and up to 3%, and balance copper, and forming the worked alloy into shaped members, placing the members adjacent each other, and welding the adjacent members together by autogenous welding of the adjacent surfaces so that the metal of the welds is of substantially the same constituency as the base metal of the welded members.

2. A method of making a fabricated structure comprising working an alloy composed of from 2% to 6% silicon, manganese in appreciable amount and up to 3% and balance copper, and forming the worked alloy into shaped members, placing the members adjacent each other, and welding the adjacent members together by autogenous welding of the adjacent surfaces so that the metal of the welds is of substantially the same constituency as the base metal of the welded members.

3. A method of making a fabricated structure comprising working an alloy composed of about 3.5% silicon, manganese in appreciable amount and up to 3%, and balance copper, and forming the worked alloy into shaped members, placing the members adjacent each other, and welding the adjacent members together by autogenous welding of the adjacent surfaces so that the metal of the welds is of substantially the same constituency as the base metal of the welded members.

4. A fabricated structure comprising a plurality of members composed of an alloy of from 0.35% to 10% silicon, manganese in appreciable amount and up to 3%, and balance copper worked into shaped members, and welded together to form the structure, the metal of the welds being of substantially the same constituency as the base metal of the welded members.

5. A fabricated structure comprising a plurality of members composed of an alloy of from 2% to 6% silicon, manganese in appreciable amount and up to 3%, and balance copper worked into shaped members, and welded together to form the structure, the metal of the welds being of substantially the same constituency as the base metal of the welded members.

6. A fabricated structure comprising a plurality of members composed of an alloy of about 3.5% silicon, manganese in appreciable amount and up to 3%, and balance copper worked into shaped members, and welded together to form the structure, the metal of the welds being of substantially the same constituency as the base metal of the welded members.

HERBERT C. JENNISON.